(12) United States Patent  
Phipps et al.

(10) Patent No.: US 10,758,440 B2  
(45) Date of Patent: Sep. 1, 2020

(54) FOAM SURFACE END OF LIFE INDICATION

(71) Applicant: Hill-Rom Services, Inc., Batesville, IN (US)

(72) Inventors: William H. Phipps, Oldenburg, IN (US); Brian Mears, Batesville, IN (US); Steven Spielmann, Batesville, IN (US); Michael Conaway, Batesville, IN (US); Joseph T. Canter, Harrison, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 16/284,569

(22) Filed: Feb. 25, 2019

(65) Prior Publication Data

US 2020/0054509 A1 Feb. 20, 2020

Related U.S. Application Data

(60) Provisional application No. 62/635,750, filed on Feb. 27, 2018.

(51) Int. Cl.
| | |
|---|---|
| *G08B 1/00* | (2006.01) |
| *A61G 7/057* | (2006.01) |
| *G01N 21/78* | (2006.01) |
| *G08B 21/18* | (2006.01) |

(52) U.S. Cl.
CPC ............. *A61G 7/057* (2013.01); *G01N 21/78* (2013.01); *G08B 21/18* (2013.01); *A61G 2203/30* (2013.01)

(58) Field of Classification Search
CPC .... A61G 7/057; A61G 2203/30; G01N 21/78; G08B 21/18
USPC ................................................... 340/309.16
See application file for complete search history.

(56) References Cited

U.S. PATENT DOCUMENTS

| 6,212,718 B1* | 4/2001 | Stolpmann ......... A61G 7/05776 |
| | | 285/914 |
| 8,870,083 B2* | 10/2014 | Myers ..................... G09F 23/00 |
| | | 235/494 |
| 8,939,379 B2* | 1/2015 | Myers ..................... A47C 31/00 |
| | | 235/494 |
| 10,060,902 B2* | 8/2018 | Patmore ................. G01N 27/12 |
| 2007/0234479 A1* | 10/2007 | Warshaver ........... A47C 31/105 |
| | | 5/690 |
| 2009/0155122 A1* | 6/2009 | Song ........................ C12Q 1/44 |
| | | 422/400 |
| 2012/0089419 A1* | 4/2012 | Huster ................... G06Q 50/24 |
| | | 705/3 |
| 2013/0221114 A1* | 8/2013 | Myers ..................... G09F 19/22 |
| | | 235/494 |
| 2014/0259410 A1* | 9/2014 | Zerhusen ............... A61G 7/012 |
| | | 5/600 |
| 2014/0292529 A1* | 10/2014 | Zerhusen ............ A61G 7/0514 |
| | | 340/815.65 |

(Continued)

*Primary Examiner* — Zhen Y Wu  
(74) *Attorney, Agent, or Firm* — Barnes & Thornburg LLP

(57) ABSTRACT

A patient support apparatus includes a frame, a support surface, and a sensor. The frame and the support surface cooperate to support a patient. The sensor is coupled to one of the frame and the support surface and is configured to provide an input signal indicative of usage of the support surface by the patient.

25 Claims, 3 Drawing Sheets

(56) References Cited

U.S. PATENT DOCUMENTS

| | | | |
|---|---|---|---|
| 2015/0082547 A1* | 3/2015 | Boyd | G05D 7/0617 5/706 |
| 2015/0121625 A1* | 5/2015 | Myers | G09F 3/00 5/636 |
| 2016/0178603 A1* | 6/2016 | Patmore | G01N 27/12 436/149 |
| 2017/0236456 A9* | 8/2017 | Myers | A47C 27/002 5/694 |

* cited by examiner

FOAM SURFACE END OF LIFE INDICATION

PRIORITY CLAIM

This application claims priority under 35 U.S.C. § 119(e) to U.S. Provisional Application No. 62/635,750, filed Feb. 27, 2018, which is expressly incorporated by reference herein.

BACKGROUND

The present disclosure is related to patient support apparatuses, and in particular to patient support apparatuses including support surfaces subject to degradation during use. More particularly, the present disclosure relates to monitoring the use of support surfaces of patient support apparatuses and mitigating the use of a support surface that has degraded.

Support surfaces wear in response to patient loads being applied to the support surfaces over time. Use of support surfaces beyond their useful lives may degrade the support surfaces and reduce the effectiveness of the support provided by the support surfaces to patients supported thereby. Degradation of the support surfaces may increase the likelihood of skin breakdown and pressure ulcers caused by support surfaces that have reached the end of their useful life.

Support surfaces should be replaced once their useful lives have expired to minimize the likelihood of skin breakdown and pressure ulcers. By doing so, the substantial costs associated with treating skin breakdown and damage resulting from patient stays on support surfaces in service beyond their useful lives may be avoided.

SUMMARY

The present application discloses one or more of the features recited in the appended claims and/or the following features which, alone or in any combination, may comprise patentable subject matter.

According to a first aspect of the present disclosure, a patient support apparatus comprises a frame, a support surface, a timer, and an indicator. The frame and a support surface cooperate to support a patient. The timer is coupled to one of the frame and the support surface. The timer is configured to provide an input signal indicative of an amount of time elapsed since installation of the support surface on the frame. The indicator is coupled to one of the frame and the support surface. The indicator is configured to display a visual indication after a predetermined time threshold is satisfied to indicate to a caregiver when the support surface should be replaced.

In some embodiments, a controller is coupled to the timer. The controller includes a processor and memory. The controller is configured to receive the input signal and determine whether the support surface should be replaced based on the input signal. The controller is configured to command the indicator to emit the indication that the support surface should be replaced after passage of the predetermined time threshold.

In some embodiments, the timer is configured to initiate upon installation of the support surface on the frame.

In some embodiments, the indicator is a visual indicator including a light-emitting diode.

In some embodiments, the support surface includes a topper that forms an upper surface of the support surface and the indicator includes a color-changing device coupled to the topper, the color-changing device configured to change a color of the topper to indicate to the caregiver when the support surface should be replaced.

In some embodiments, the indicator includes a color-changing label coupled to the support surface, the color changing label configured to display a spectrum of color associated with the status of the useful life of the support surface.

In some embodiments, the color changing label includes an indicator strip and a plurality of status markers arranged to lie in spaced apart relation to one another along the indicator strip, the indicator strip configured to display the color spectrum that extends down the indicator strip in relation to the plurality of status markers to indicate the status of the useful life of the support surface.

According to a second aspect of the present disclosure, a patient support apparatus comprises a frame, a support surface, a timer, an indicator and a usage measuring device. The frame and a support surface cooperate to support a patient. The timer is coupled to one of the frame and the support surface. The timer is configured to provide an input signal indicative of an amount of time elapsed since installation of the support surface on the frame. The indicator is coupled to one of the frame and the support surface. The indicator is configured to display a visual indication after a predetermined time threshold is satisfied to indicate to a caregiver when the support surface should be replaced. The usage measuring device is configured to provide an input signal indicative of usage of the support surface by the patient.

In some embodiments, a controller is coupled to the timer and the usage measuring device, the controller including a processor and memory. The controller configure to receive the input signals from the timer and the usage measuring device, determine an amount of time elapsed, determine usage of the support surface, and command the indicator to emit the indication that the support surface should be replaced after a predetermined time threshold is satisfied and a predetermined usage threshold of the support surface is satisfied.

In some embodiments, the input signal is indicative of a compression set of the support surface.

In some embodiments, the usage measuring device includes a sensor in the support surface to sense the presence of the patient on the support surface.

In some embodiments, the controller is configured to determine whether the support surface should be replaced based on a calculated duty cycle of the support surface.

In some embodiments, the duty cycle is adjusted to compensate for one of the weight of the patient supported by the support surface, movement of the patient on the support surface, a compression set of a portion of the support surface, or a position of a head section of a deck of the frame relative to a seat section of the deck.

In some embodiments, the controller starts the timer upon installation of the support surface on the frame.

In some embodiments, the indicator is a visual indicator including a light-emitting diode.

In some embodiments, the support surface includes a topper that forms an upper surface of the support surface and the indicator includes a color-changing device coupled to the topper, the color-changing device configured to change a color of the topper to indicate to the caregiver when the support surface should be replaced.

In some embodiments, the indicator includes a color label coupled to the support surface, the color label configured to gradually display a spectrum of colors according to a spectrum profile associated with a remaining useful life of the support surface.

In some embodiments, the color label includes an indicator strip and a plurality of status markers arranged to lie in spaced apart relation to one another along the indicator strip, the indicator strip is configured to gradually display the color spectrum according to the spectrum profile that extends down the indicator strip in relation to the plurality of status markers to indicate the remaining useful life of the support surface.

According to a third aspect of the present disclosure, an apparatus comprises a timer and an indicator. The timer is coupled to one of the frame and the support surface. The timer is configured to provide an input signal indicative of an amount of time elapsed since installation of the support surface on the frame. The indicator is coupled to one of the frame and the support surface. The indicator is configured to display a visual indication after a predetermined time threshold is satisfied to indicate to a caregiver when a support surface should be replaced.

In some embodiments, the apparatus further includes a controller coupled to the timer and including a processor and memory. The controller is configured to receive the input signal and command the indicator to emit the indication that the support surface should be replaced after passage of the predetermined amount of time.

In some embodiments, the indicator includes a visual indicator.

According to a fourth aspect of the present disclosure, an apparatus comprises a timer, an indicator, and a usage measuring device. The timer is coupled to one of the frame and the support surface. The timer is configured to provide an input signal indicative of an amount of time elapsed since installation of the support surface on the frame. The indicator is coupled to one of the frame and the support surface. The indicator is configured to display a visual indication after a predetermined time threshold is satisfied to indicate to a caregiver when a support surface should be replaced. The usage measuring device is configured to provide an input signal indicative of usage of the support surface by the patient.

In some embodiments, the apparatus further includes a controller coupled to the timer and the usage measuring device. The controller including a processor and memory. The controller configure to receive the input signals from the timer and the usage measuring device, determine an amount of time elapsed, determine usage of the support surface, and command the indicator to emit the indication that the support surface should be replaced after a predetermined time threshold is satisfied and a predetermined usage threshold of the support surface is satisfied.

In some embodiments, the indicator includes a visual indicator.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 2A is a perspective view of the support surface showing that the indicator illustratively displays a generally blue color to represent that the support surface has remaining useful life;

FIG. 2B is a perspective view of the support surface showing that the indicator illustratively displays a generally light blue color to represent that the support surface is nearing the end of its useful life;

FIG. 2C is a perspective view of the support surface showing that the indicator illustratively displays a generally gray color to represent that the support surface has reached the end of its useful life;

FIG. 3B is an enlarged elevation view of the indicator label showing that the color spectrum illustratively extends downward along the color strip from a first status marker to a second status marker to indicate to a caregiver that the support surface has a remaining useful life of about 4 years;

FIG. 3C is an enlarged elevation view of the indicator label showing that the color spectrum illustratively extends downward along the color strip from the first status marker, past the second and a third status marker, and generally aligns with a fourth status marker to indicate to a caregiver that the support surface has a remaining useful life of about 2 years;

FIG. 3D is an enlarged elevation view of the indicator label showing that the color spectrum illustratively extends downward along the color strip from the first status marker and past second, third, fourth, and fifth status markers to indicate to a caregiver that the support surface has reached the end of its useful life.

DETAILED DESCRIPTION OF THE DRAWINGS

Figure 1:
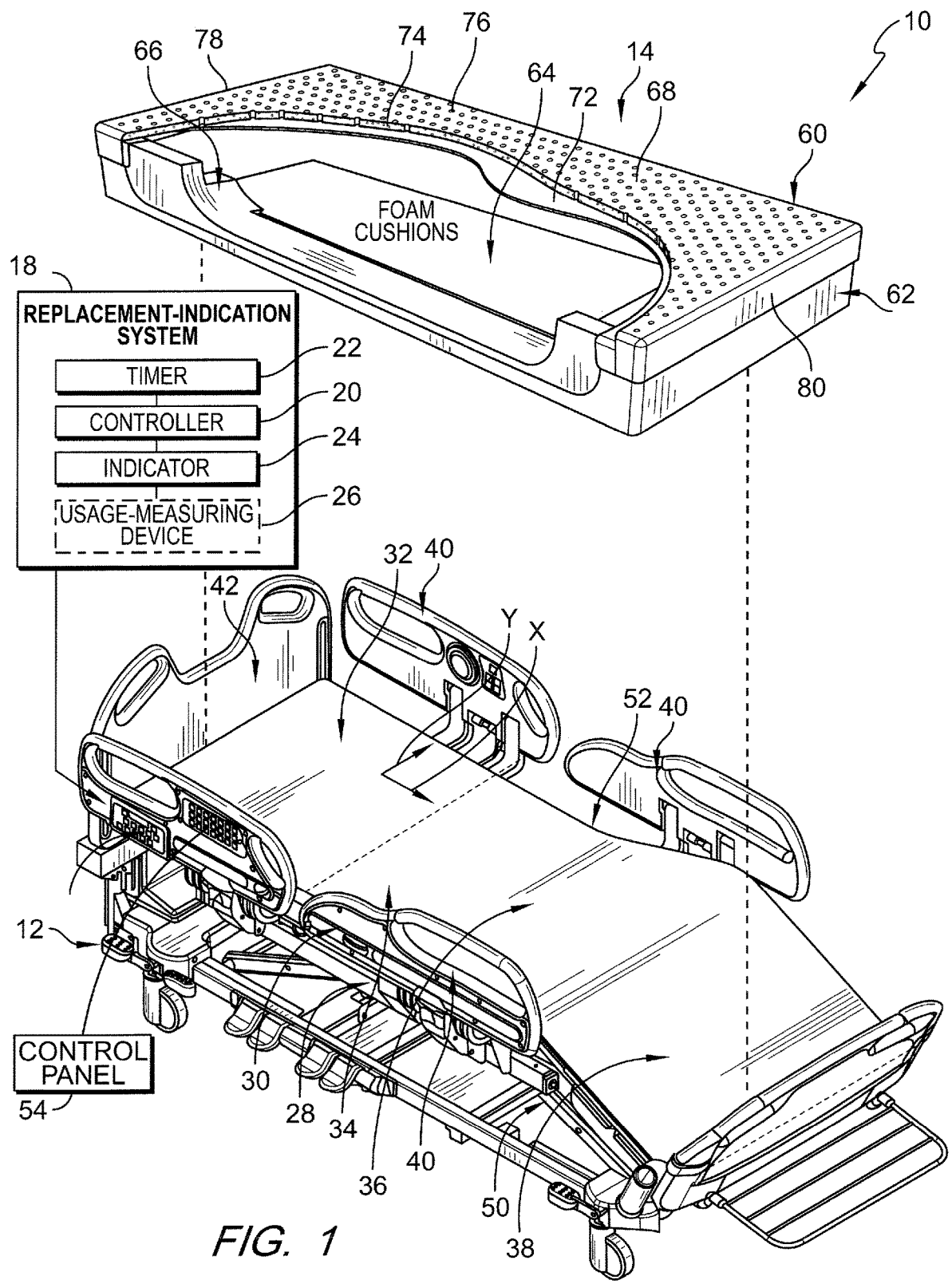
FIG. 1 is an exploded perspective view of a patient support apparatus that includes a frame, a support surface cooperating with the frame to support a patient (omitted for the sake of simplicity), and a replacement indication system configured to determine when the support surface has reached the end of its useful life and display a signal to a caregiver indicating that replacement of the support surface is needed.

Referring to FIG. 1, an illustrative patient support apparatus 10 is shown. The patient support apparatus 10 includes a frame 12 supported by wheels or casters and a support surface 14 that cooperates with the frame 12 to support a patient above a floor 16 on which the patient support apparatus 10 rests.

The patient support apparatus 10 further includes a replacement indication system 18 that is coupled to one of the frame 12 and the support surface 14. The replacement indication system 18 is configured to determine when the support surface 14 has reached the end of its useful life and display a signal to a caregiver indicating that replacement of the support surface 14 is needed. As will be explained in further detail below, the replacement indication system 18 displays a visual indicator 24 on the patient support apparatus 10 when the support surface 14 has reached the end of its useful life.

The replacement indication system 18 is configured to provide an input signal based on information associated with the end of the useful life of the support surface 14. The replacement indication system 18 includes a controller 20 that is configured to process the information associated with the end of the useful life of the support surface 14 and control the replacement indication system 18. The replacement indication system 18 sends the input signal to the controller 20 to determine whether the support surface 14 should be replaced based on a useful life status of the support surface 14. The controller 20 includes a processor 96 and a memory device 98. The memory device 98 includes instructions which are executed by the processor 96 as described herein so that the controller 20 can accomplish the tasks and functions described in the present disclosure. For example, the processor 96 may be embodied as a single or multi-core processor(s), a single or multi-socket processor, a digital signal processor, a graphics processor, a microcontroller, or other processor or processing/controlling circuit. Similarly, the memory 98 may be embodied as any type of volatile or non-volatile memory or data storage capable of performing the functions described herein. In operation, the memory 98 may store various data and software used during operation of the controller 20 such as operating systems, applications, programs, libraries, and drivers. The memory 98 is communicatively coupled to the processor 96 by circuitry and/or components to facilitate input/output operations with the processor 96, the memory 98, and other components of the patient support apparatus 10. For example, communication circuitry may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the communications circuitry may form a portion of a system-on-a-chip (SoC) and be incorporated, along with the processor 96, the memory 98, and other components of the controller 20 on a single integrated circuit chip.

The controller 20 compares the information received to one or more predetermined thresholds indicating that the support surface 14 has reach the end of its useful life. If the one or more predetermined thresholds are satisfied, the controller 20 commands the indicator 24 to emit an indication that the support surface 14 has reached the end of its useful life and should be replaced.

The patient support apparatus 10 shown in FIG. 1 is illustratively embodied as a hospital bed. In other embodiments, however, the patient support apparatus 10 may be embodied as any one of a number of suitable patient support apparatuses. For example, the patient support apparatus 10 may be embodied as a recovery bed, a wheel chair, a stretcher, or the like.

The illustrative frame 12 of the patient support apparatus 10 is shown in detail in FIG. 1. The frame 12 includes a lower frame 29, an upper frame 28, and a deck 30 coupled to the upper frame 28. The deck 30 is movable to a plurality of positions as illustrated by FIG. 1. The deck 30 includes a head-deck section 32, a seat-deck section 34, a thigh-deck section 36, and a foot-deck section 38. The head-deck section 32 is mounted to the upper frame 28 to pivot about an axis relative to the seat-deck section 34 and to slide relative to the seat-deck section 34 and the upper frame 28 as described U.S. Publication Nos. 2010/0122415, 2012/0005832, and 2017/0196743, each of which is incorporated herein in their entirety. The seat-deck section 34 is coupled to the upper frame 28 to move with the upper frame 28. The thigh-deck section 36 is coupled to the seat-deck section 34 to pivot relative to the seat-deck section 34. The foot-deck section 38 is coupled to the thigh-deck section 36 to pivot relative to the thigh-deck section 36. The foot-deck section 38 is also extendable and retractable to lengthen or shorten the deck 30 as desired by a caregiver or to accommodate repositioning of the deck 30.

The patient support apparatus 10 illustratively includes a number of siderails 40, a headboard 42, and a footboard 44, each of which is supported by the frame 12 as shown in FIG. 1. The headboard 42 is positioned adjacent a head end 46 of the patient support apparatus 10. The footboard 44 is positioned adjacent a foot end 48 of the patient support apparatus 10 arranged opposite the head end 46. The siderails 40 extend between the head and foot ends 46, 48 along opposite sides 50, 52 of the patient support apparatus 10.

The patient support apparatus 10 illustratively includes a control panel 54 as shown in FIG. 1. The control panel 54 embodies a caregiver input-output device that is coupled to the controller 20 to communicate with the controller 20. In the illustrative embodiment, the control panel 54 is affixed to one of the siderails 40 and is thereby supported by the frame 12. In other embodiments, however, the control panel 54 may be affixed to another component of the patient support apparatus 10 so that the control panel 54 is supported by the frame 12. In other embodiments still, the control panel 54 may be removably coupled to the frame 12.

The control panel 54 illustratively includes a touchscreen display 56 as shown in FIG. 1. The touchscreen display 56 provides a user interface enabling the caregiver to configure, activate, and deactivate certain electronically controlled functions of the patient support apparatus 10. The display 56 may provide visual indications to the caregiver regarding certain of the electronically controlled functions of the patient support apparatus 10 or certain characteristics of the patient. The control panel 54 may also include a speaker configured to provide audible indications to the patient or the caregiver.

Figure 2A:
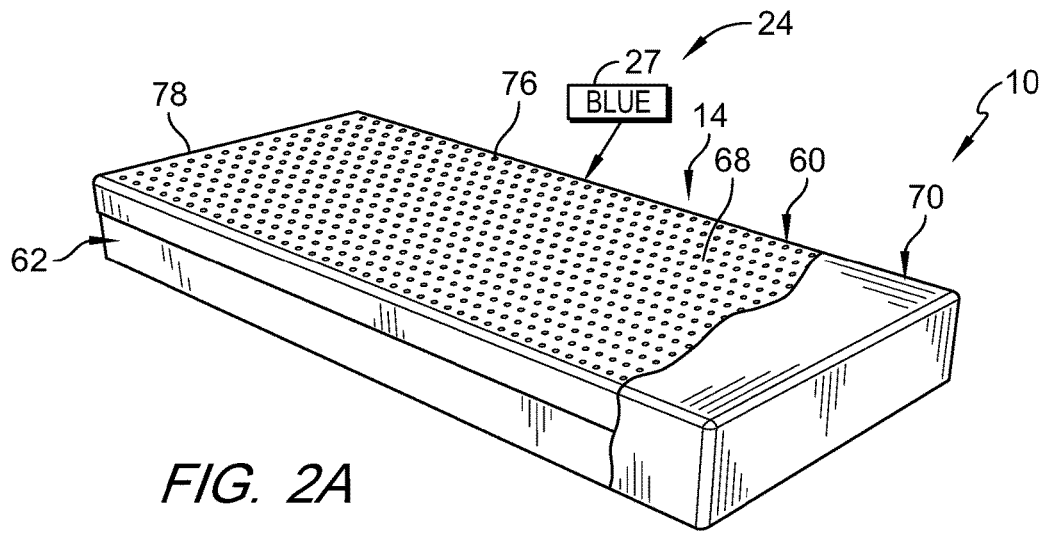
FIGS. 2A-2C are a series of perspective views of the support surface including another illustrative embodiment of an indicator, in accordance with the present disclosure, showing that the support surface includes a topper and an indicator is coupled to the topper and is configured to change a color of the topper.

The support surface 14 is illustratively embodied as, or otherwise includes, a deformable support surface such as a mattress as shown in FIG. 1. The support surface 14 includes a topper 60 and a lower ticking 62 that cooperate to encase a plurality of foam cushions 64 (shown in simplified diagrammatic form) and a foam shell 66. The topper 60 forms a top face 68 of the support surface 14. The topper 60 may be configured to conduct pressurized air along an interface between the patient and the support surface 14 to cool and dry the patient's skin when the patient is supported on the support surface 14. In some embodiments, the support surface 14 may also include a coverlet 70 encasing the topper 60 and the lower ticking 62 as shown in FIG. 2A.

In the illustrative embodiment, the foam cushions 64 and the foam shell 66 have a polymeric construction. For example, the foam cushions 64 and the foam shell 66 are constructed of latex, viscoelastic, or polyurethane materials. It should be appreciated, however, that in other embodiments, the foam cushions 64 and the foam shell 66 may have another suitable construction.

In the illustrative embodiment, the foam cushions 64 cooperate to support the patient supported on the support surface 14. Patient usage of the support surface 14 causes the foam cushions 64 to wear over time, thereby reducing cushioning and support provided by the foam cushions 64. The useful life of the support surface 14 as described herein therefore refers primarily to the useful life of the foam cushions 64 (i.e., the predetermined period during which cushioning and support provided by the foam cushions 64 is deemed to be acceptable). As such, the controller 20 is configured to determine whether the support surface 14 should be replaced based primarily on whether the useful life of the foam cushions 64 has been exceeded.

In other embodiments, however, the foam cushions 64 may cooperate with other components to support the patient supported on the support surface 14. For example, the foam cushions 64 may cooperate with polyurethane gels and/or inflatable air bladders to support the patient supported on the support surface 14. In those embodiments, the controller 20 may be configured to determine whether the support surface 14 should be replaced based at least in part on whether the useful life of the polyurethane gels and/or the inflatable air bladders has been exceeded.

The topper 60 illustratively includes a bottom layer 72, a middle layer 74, and a top layer 76 as shown in FIG. 2. The middle layer 74 may be a three-dimensional material that allows pressurized air to flow between the bottom layer 72 and the top layer 76 along the top face 66 between opposite head and foot ends 78, 80 of the support surface 14. The top layer 76 may be made from a perforated material that allows moisture from the patient supported on the support surface 14 to pass through the top layer 76 and be carried away for evaporation by air flowing through the middle layer 74. For example, the top layer 76 may be made from, or otherwise include, a urethane coated nylon ticking material that is air impermeable but vapor permeable.

A first embodiment of the replacement indication system 18, in accordance with the present disclosure, includes a timer 22 and the indicator 24 as shown in FIG. 1. The timer 22 is coupled to one of the frame 12 or the support surface 14. In one example, the timer 22 is configured to measure an amount of time elapsed after the support surface 14 is installed on the frame 12. The indicator 24 may be coupled to one of the frame 12 or the support surface 14 or may be located in a remote location assessable to the caregiver. The indicator 24 is configured indicate that the support surface 14 has reached the end of its useful life and should be replaced.

The controller 20 is coupled to the timer 22 and the indicator 24 to control the replacement indication system 18. The timer 22 sends an input signal to the controller 20 associated with the amount of time elapsed since the installation of the support surface 14 on the frame 12. The controller 20 compares the amount of time elapsed with a predetermined time threshold. The predetermined time threshold represents a time when the support surface 14 reaches the end of its useful life. If the amount of time elapsed exceeds the predetermined time threshold, the controller 20 sends a signal to the indicator 24 to emit an indication that the support surface 14 has reached the end of its useful life and should be replaced.

In another example, the timer 22 counts down from the predetermined time threshold. When the timer 22 reaches an amount of time equal to 0, the controller 20 sends a signal to the indicator 24 to indicate that the support surface 14 has reached the end of its useful life and should be replaced.

The indicator 24 is configured to notify the caregiver when the support surface 14 should be replaced. The indicator 24 may notify a caregiver using a number of different methods described in detail below.

In one example, the indicator 24 includes a visual indicator, such as a light-emitting diode (LED). The LED is configured to emit light once controller 20 determines that the predetermined time threshold is reached to indicate that the support surface has reached the end of its useful life. The LED may be coupled to the patient support apparatus 10 or may be located in a remote location assessable and visible to the caregiver, such as a nurse call station.

Illustratively, a polychromatic LED may be configured to emit a different color of light depending on a current status of the support surface 14. For example, the controller 20 may send a signal to the indicator 24 to emit a green colored light when the amount of time elapsed is less than the predetermined time threshold. After the predetermined time threshold is achieved, the controller 20 may send a signal to the indicator 24 to emit a red colored light to indicate that the support surface 14 has reached the end of its useful life. Additionally, the indicator 24 may display one or more intermediate colors of light to indicate the progression of elapsed time as the predetermined time threshold draws near.

Figure 2B:
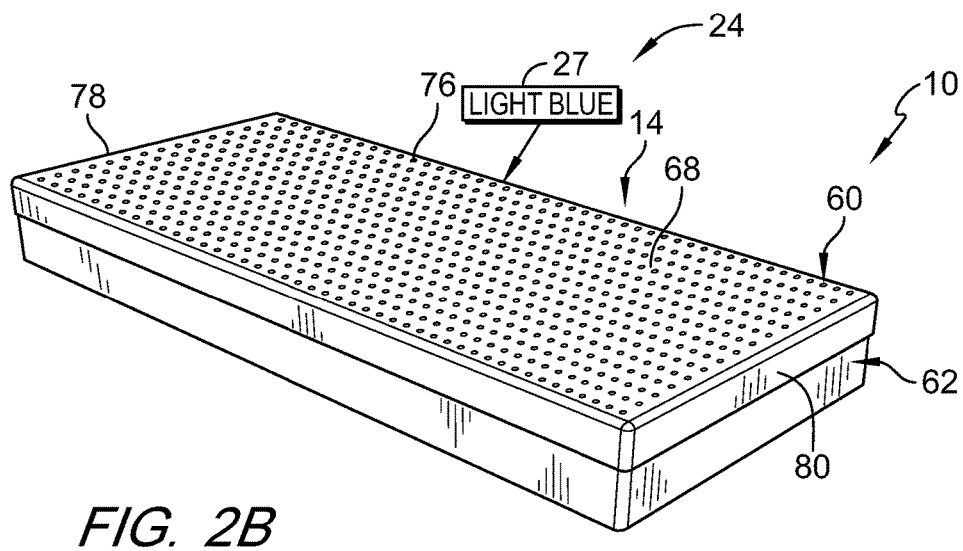
Figure 2C:
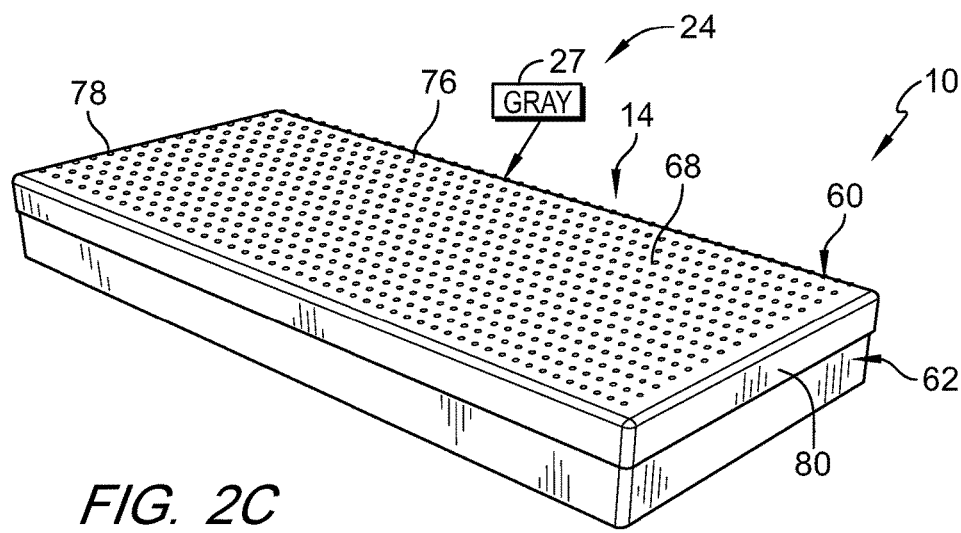

In another example, the indicator 24 includes a color-changing device 27 coupled to the topper 60 of the support surface 14 as shown in FIGS. 2A-2C. The color-changing device 27 is configured to change the color of the top surface 68 or the coverlet 70 of the topper 60 as the amount of time progresses. In one example, the color-changing device 27 is arranged to lie across the top surface 68 of the topper 60. In another example, the color-changing device is integrated into the top surface 68 of the topper 60 or the coverlet 70.

Illustratively, the top surface 68 is configured to display a blue color when the support surface 14 is initially installed onto the frame 12 as shown in FIG. 2A. As the amount of time progresses, the top surface 68 changes color to indicate the useful life status of the support surface 14. For example, the top surface 68 may display a lighter shade of blue color towards the end of the useful life of the support surface 14 as shown in FIG. 2B. When the support surface 14 has reached the end of its useful life, the top surface 68 may display a grey color, for example, as shown in FIG. 2C. The controller 20 operates the color-changing device 27 based on information received from the timer 22 or one or more other sensors or devises used to determine the useful life of the support surface. In other embodiments, any color may be displayed by the top surface to indicate the useful life status of the support surface 14.

Figure 3:
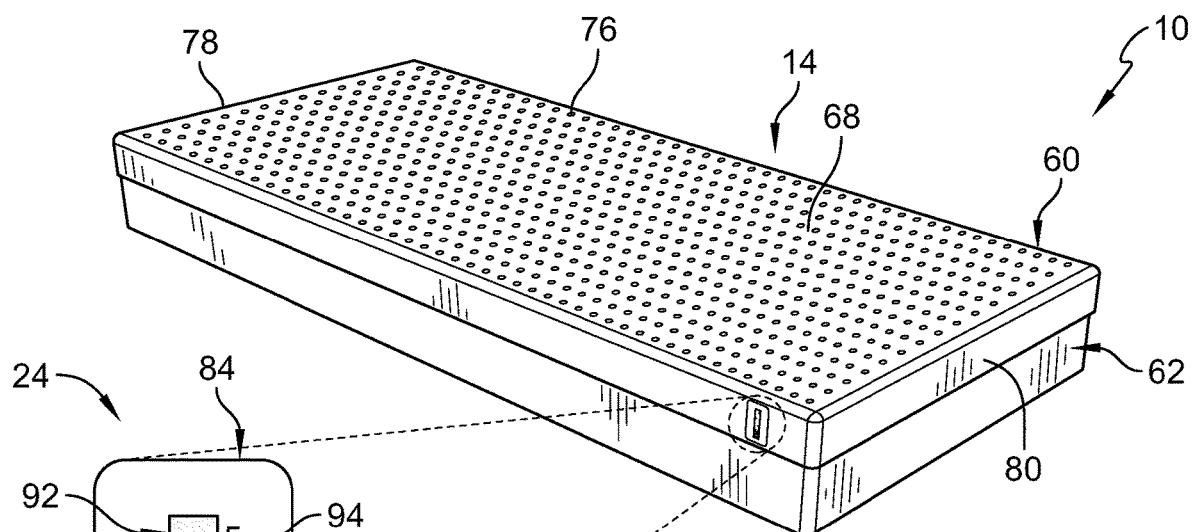
FIG. 3 is a perspective view of the support surface including another illustrative embodiment of an indicator, in accordance with the present disclosure, showing that the indicator includes an indicator label coupled to the support surface.
Figure 3A:
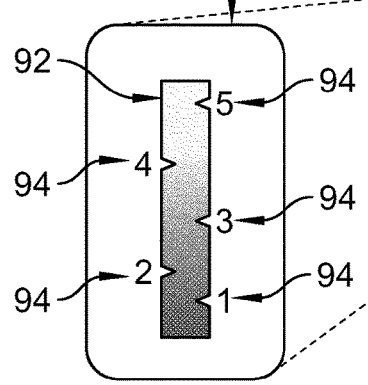
FIG. 3A is an enlarged elevation view of the indicator label of FIG. 3 showing that the indicator label includes a color strip and a plurality of status markers arranged to lie along the color strip in spaced-apart relation to one another.
Figure 4:
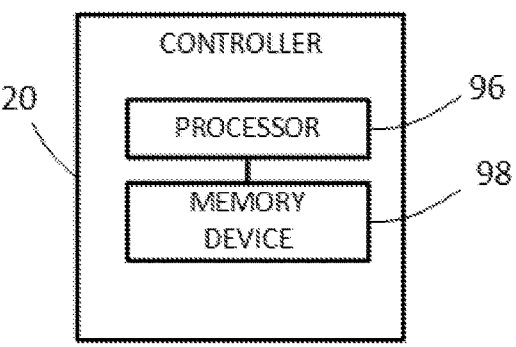
FIG. 4 is a block diagram of the controller of the replacement detection system of FIG. 1.
Figure 3B:
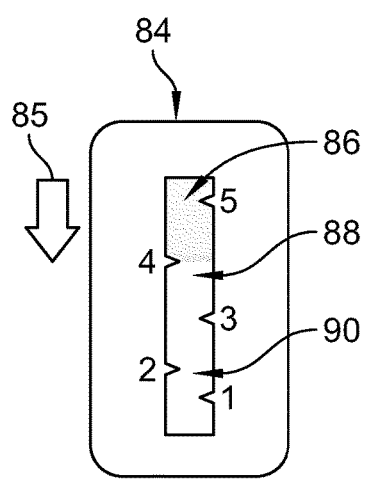
FIGS. 3B-3D are a series of enlarged elevation views similar to FIG. 3A showing that the indicator label is configured to display a color spectrum representative of a status of the useful life of the support surface and showing that the color spectrum is configured to gradually appear along the color strip an align with the status markers to indicate to a caregiver the useful life of the support surface.
Figure 3C:
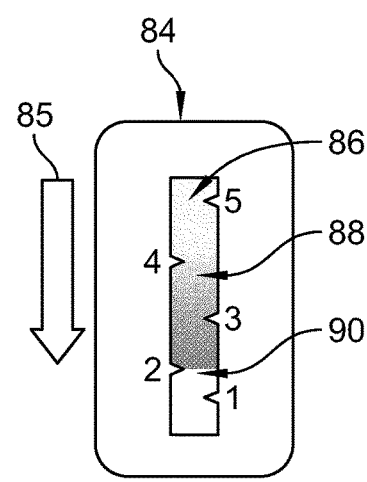
Figure 3D:
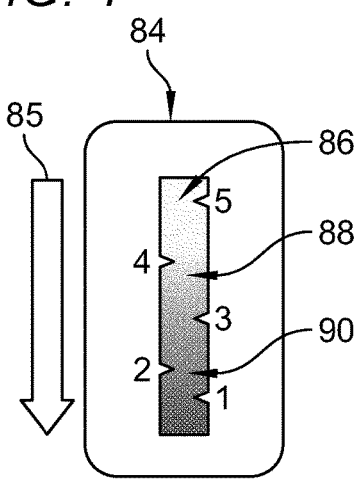

In another example, the indicator 24 includes a color label 84 that is coupled to the topper 60 or the ticking 62 as shown in FIGS. 3A-3D. The color label 84 is configured to display a spectrum of colors to indicate when the support surface has reached the end of its useful life and includes an indicator strip 92 and a plurality of status marks 94 as shown in FIG. 3A. The indicator strip 92 is configured to change colors according to a spectrum profile 85 as the support surface 14 ages as shown in FIGS. 3B-3D. The status marks 94 cooperate with the spectrum profile 85 to provide an indication of a remaining useful life in the support surface 14 (shown, illustratively, in FIG. 3A-3D by numbers 1 through 5, representing years). The controller 20 operates the color label 84 to gradually display the spectrum of colors according to the spectrum profile 85 based on information received from the timer 22 or one or more other sensors or devises used to determine the useful life of the support surface.

The spectrum profile 85 is configured to represent the useful life of the support surface 14 by gradually displaying the spectrum of colors in proportion with the amount of time elapsed as shown in FIGS. 3B-3D. Illustratively, the color label 84 displays a generally white color when the support surface 14 is initially installed onto the frame 12. The generally white color is displayed across a length of the color label 84 including an upper section 86, a middle section 88, and a lower section 90. Over time, the color label 84 illustratively displays a generally orange color along the middle section 88 of the color label 84 as shown in FIG. 3C. As shown in FIG. 3C, the spectrum profile 85 aligns with a status mark 94 illustratively labeled with a number 2 to represent that the support surface has a remaining useful life of about two years. As time continues, the lower section 90 of the color label 84 illustratively displays a generally red color as shown in FIG. 3D. When the spectrum profile 85 reaches a bottom of the indicator strip 92 and illustratively displays the generally red color, the caregiver is alerted that the support surface 14 has reached the end of its useful life.

Although 5 status marks 94 are shown in the illustrative embodiment, any number of status marks may be used. Additionally, in other embodiments, the numbers associated with the status marks 94 may represent any suitable time period such as, for example, decades, months, weeks, or days. Further, any color may be displayed by the color label 84 to indicate the useful life status of the support surface 14.

In another example, the indicator 24 may be an audible indicator, such as an alarm, emitted from an audible device. The audible device is configured to initiate when the controller 20 determines that the predetermined time threshold has been reached to indicate that the support surface has reached the end of its useful life. The audible device may be coupled to the patient support apparatus 10 or may be located in a remote location assessable and audible to the caregiver. In yet another example, a combination of visual and audible indicators may be used.

In other embodiments, the replacement indication system 18 may further include a usage measuring device 26 as shown in FIG. 1. The usage measuring device 26 is configured to detect and measure usage of the support surface 14 by a patient and send an input signal to the controller 20 associated with the usage of the support surface 14.

Usage of the support surface 14 by the patient is illustratively characterized by the detected presence, or lack thereof, of the patient on the support surface 14 over time. The usage measuring device 26 is therefore illustratively embodied as, or otherwise includes, one or more devices or sensors configured to monitor the presence (or absence) of the patient on the support surface 14 over time.

The usage measuring device 26 illustratively includes a device or system configured to measure the degree to which the support surface 14 is permanently deformed when a load (e.g., a patient load) applied to the support surface 14 is removed (e.g., when the patient exits the support surface 14). For instance, the usage measuring device 26 may include electrical contacts, load cells, or another suitable sensing device configured to measure a compression set of the support surface 14. In such an embodiment, the usage measuring device 26 is configured to send an input signal to the controller 20 every time a patient enters and leaves the support surface 14 to represent a number of compressions on the support surface 14.

The controller 20 is configured to receive input signals from the usage measuring device 26 based on the compression set or duty cycle of the support surface 14 and compare those input signals to a predetermined usage threshold. The controller 20 receives simultaneously the input signal from the timer 22 and compares the amount of time elapsed to the predetermined time threshold. When the predetermined usage threshold is satisfied and the predetermined time threshold is satisfied, the controller 20 is configured to command the indicator 24 to emit an indication that the support surface has reached the end of its useful life.

In some embodiments, the usage measuring device 26 may further include a device or system configured to detect the patient's weight on the support surface 14. The usage measuring device 26 may include one or more load cells configured to detect a patient load applied by the patient to the support surface 14. The usage measuring device 26 may also be embodied as, or otherwise include, a patient positioning monitoring system.

In some embodiments, the usage measuring device 26 may be used to determine one or more duty cycles of the support surface 14. When the patient load is indicated by the usage measuring device 26 to be applied to the support surface 14, the controller 20 may initialize the timer 22 to track the time period during which the support surface 14 is in use by the patient (i.e., the duty cycle of the support surface 14). The controller 20 may be configured to determine whether the support surface 14 should be replaced based on the one or more duty cycles of the support surface 14. The duty cycle may include the total amount of time that the load is applied. In some embodiments, the duty cycle may further factor in the patient's weight into the duty cycle calculation. For example a patient weighing 200 pounds will tend to degrade a support surface 14 to a greater extent than a patient weighing 150 pounds, for the same time period of use. The higher load will tend to degrade the components of the support surface 14. Thus, it is contemplated that the duty cycle calculation may, in some embodiments, accumulate the load as a function of time to determine the duty cycle.

Although certain illustrative embodiments have been described in detail above, variations and modifications exist within the scope and spirit of this disclosure as described and as defined in the following claims.

The invention claimed is:
1. A patient support apparatus comprising
a support surface configured to support a patient over a useful life of the support surface,
a timer configured to provide an input signal after passage of a predetermined amount of time associated with a useful life status of the support surface, and
an indicator configured to display a visual indication after the predetermined amount of time is reached to indicate when the support surface should be replaced,
wherein the indicator includes a color-changing label coupled to the support surface, the color changing label configured to display a spectrum of color associated with the useful life status of the support surface and including an indicator strip and a plurality of status markers arranged to lie in spaced apart relation to one another along the indicator strip, the indicator strip configured to display the color spectrum relative to the plurality of status markers to indicate the useful life status of the support surface with the color spectrum and the plurality of status markers.

2. The patient support apparatus of claim 1, wherein the patient support apparatus further includes a frame arranged to underlie the support surface and support the support surface above a floor.

3. The patient support apparatus of claim 1, wherein the timer is coupled to one of a frame and the support surface.

4. The patient support apparatus of claim 1, further including a controller coupled to the timer and including a processor and memory, the controller configured to send the input signal and command the indicator to emit the indication that the support surface should be replaced after passage of the predetermined amount of time.

5. The patient support apparatus of claim 1, wherein the timer is configured to initiate upon installation of the support surface on a frame.

6. The patient support apparatus of claim 1, wherein the indicator includes a light-emitting diode.

7. A patient support apparatus comprising
a support surface configured to support a patient,
an indicator configured to display an indication,
a usage measuring device coupled to the support surface, the usage measuring device configured to provide an input signal indicative of usage of the support surface by the patient, and
a controller coupled to the indicator and the usage measuring device, the controller including a processor and memory, the controller configured to receive the input signal from the usage measuring device, determine usage of the support surface, and command the indicator to emit the indication that the support surface should be replaced after a predetermined usage threshold of the support surface is satisfied,
wherein the indicator includes a color label coupled to the support surface, the color label configured to gradually display a spectrum of colors according to a spectrum profile associated with a remaining useful life of the support surface, the color label including an indicator strip and a plurality of status markers arranged to lie in spaced apart relation to one another along the indicator strip, the indicator strip is configured to gradually display the color spectrum according to the spectrum profile relative to the plurality of status markers to indicate the remaining useful life of the support surface.

8. The patient support apparatus of claim 7, further comprising a timer configured to provide an input signal after passage of a predetermined amount of time, the controller configure to receive the input signals from the timer and the usage measuring device, determine an amount of time elapsed, determine usage of the support surface, and command the indicator to emit the indication that the support surface should be replaced after a predetermined time threshold is satisfied and the predetermined usage threshold of the support surface is satisfied.

9. The patient support apparatus of claim 7, wherein the input signal is indicative of a compression set of the support surface.

10. The patient support apparatus of claim 7, wherein the usage measuring device includes a sensor in the support surface to sense a presence of the patient on the support surface.

11. The patient support apparatus of claim 7, wherein the controller is configured to determine whether the support surface should be replaced based on a calculated duty cycle of the support surface.

12. The patient support apparatus of claim 11, wherein the duty cycle is adjusted to compensate for one of a weight of the patient supported by the support surface, movement of the patient on the support surface, a compression set of a portion of the support surface, or a position of a head section of a deck of a frame relative to a seat section of the deck.

13. The patient support apparatus of claim 7, wherein time is started upon installation of the support surface.

14. The patient support apparatus of claim 7, wherein the indicator includes a light-emitting diode.

15. An apparatus comprising
a timer configured to provide an input signal after passage of a predetermined amount of time,
an indicator coupled to a support surface, the indicator configured to display an indication after a predetermined amount of time associated with a status of the useful life of the support surface, and
a controller coupled to the timer and including a processor and memory, the controller configured to receive the input signal and command the indicator to emit the indication that the support surface should be replaced after passage of the predetermined amount of time,
wherein the indicator includes a color label coupled to the support surface, the color label configured to gradually display a spectrum of colors according to a spectrum profile associated with a remaining useful life of the support surface, the color label including an indicator strip and a plurality of status markers arranged to lie in spaced apart relation to one another along the indicator strip, the indicator strip is configured to gradually display the color spectrum according to the spectrum profile relative to the plurality of status markers to indicate the remaining useful life of the support surface.

16. The apparatus of claim 15, wherein time is started upon installation of the support surface on a frame.

17. The apparatus of claim 15, wherein the indicator includes a light-emitting diode.

18. The apparatus of claim 15, further comprising a usage measuring device configured to provide an input signal indicative of usage of the support surface by a patient.

19. An apparatus comprising
an indicator configured to display an indication,
a usage measuring device configured to provide an input signal indicative of usage of a support surface by a patient, and
a controller coupled to the indicator and the usage measuring device, the controller including a processor and memory, the controller configure to receive the input signal from the usage measuring device, determine usage of the support surface, and command the indicator to emit the indication that the support surface should be replaced after a predetermined usage threshold of the support surface is satisfied,
wherein the indicator includes a color-changing label coupled to the support surface, the color changing label configured to display a spectrum of color associated with a status of useful life of the support surface and including an indicator strip and a plurality of status markers arranged to lie in spaced apart relation to one another along the indicator strip, the indicator strip configured to display the color spectrum relative to the plurality of status markers to indicate the status of the useful life of the support surface with the color spectrum and the plurality of status markers.

20. The apparatus of claim 19, further comprising a timer configured to provide an input signal after passage of a predetermined amount of time, the controller configure to receive the input signals from the timer and the usage measuring device, determine an amount of time elapsed, determine usage of the support surface, and command the indicator to emit the indication that the support surface should be replaced after a predetermined time threshold is satisfied and the predetermined usage threshold of the support surface is satisfied.

21. The apparatus of claim 19, wherein the input signal is indicative of a compression set of the support surface.

22. The apparatus of claim 21, wherein the usage measuring device includes a sensor in the support surface to sense a presence of the patient on the support surface.

23. The apparatus of claim 19, wherein the controller is configured to determine whether the support surface should be replaced based on a calculated duty cycle of the support surface.

24. The apparatus of claim 23, wherein the duty cycle is adjusted to compensate for one of the weight of the patient supported by the support surface, movement of the patient on the support surface, a compression set of a portion of the support surface, or a position of a head section of a deck of a frame relative to a seat section of the deck.

25. The apparatus of claim 19, wherein the indicator includes a light-emitting diode.

* * * * *